US010380900B2

(12) United States Patent
Batla et al.

(10) Patent No.: US 10,380,900 B2
(45) Date of Patent: Aug. 13, 2019

(54) INFORMATION COLLECTION AND COMPONENT/SOFTWARE UPGRADES FOR UNMANNED AERIAL VEHICLES

(71) Applicant: Verizon Patent and Licensing Inc., Arlington, VA (US)

(72) Inventors: Hani Batla, Teaneck, NJ (US); Ashok N. Srivastava, Mountain View, CA (US); Douglas M. Pasko, Bridgewater, NJ (US); Igor Kantor, Raleigh, NC (US); Gurpreet Ubhi, Nutley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 931 days.

(21) Appl. No.: 14/282,195

(22) Filed: May 20, 2014

(65) Prior Publication Data
US 2016/0217694 A1 Jul. 28, 2016

(51) Int. Cl.
*B64C 39/02* (2006.01)
*B64D 47/08* (2006.01)
*G05D 1/10* (2006.01)
*G06Q 10/08* (2012.01)
*G08G 5/00* (2006.01)

(52) U.S. Cl.
CPC .......... *G08G 5/0034* (2013.01); *G05D 1/101* (2013.01); *G06Q 10/083* (2013.01); *G08G 5/0013* (2013.01); *G08G 5/0039* (2013.01); *G08G 5/0043* (2013.01); *G08G 5/0069* (2013.01); *G08G 5/0082* (2013.01); *G08G 5/0091* (2013.01)

(58) Field of Classification Search
CPC .. G08G 5/0034; G08G 5/0039; G08G 5/0004; B64C 39/024; B64C 2201/128; G05D 1/101; G06Q 10/083; B64D 47/08
See application file for complete search history.

(56) References Cited

U.S. PATENT DOCUMENTS

| 4,642,775 A * | 2/1987 | Cline .................... G01C 23/00 701/528 |
| 8,577,538 B2 * | 11/2013 | Lenser ................. G05D 1/0274 701/2 |
| 2008/0109160 A1 * | 5/2008 | Sacle .................... G08G 5/065 701/33.4 |
| 2011/0118907 A1 * | 5/2011 | Elkins ....................... B64B 1/00 701/3 |

(Continued)

OTHER PUBLICATIONS

Wikipedia article Online Shopping, printed Jul. 11, 2016.*

(Continued)

*Primary Examiner* — Alan D Hutchinson

(57) ABSTRACT

A device receives, from a user device, a request for a flight path for a UAV to travel in a geographical region, and determines a suggested component/software for the UAV based on capability information associated with the UAV. The device provides, to the user device, information associated with the suggested component/software, and calculates the flight path based on the capability information, real time information, and non-real time information associated with the geographical region. The device generates flight path instructions for the flight path, and provides the flight path instructions to the UAV to permit the UAV to travel in the geographical region via the flight path.

20 Claims, 11 Drawing Sheets

(56) References Cited

U.S. PATENT DOCUMENTS

2011/0137551 A1* 6/2011 Peri ................... G01C 21/3453
 701/533
2015/0325064 A1* 11/2015 Downey ................ G08G 5/006
 701/29.3

OTHER PUBLICATIONS

Wikipedia; Online Shopping; 2014 (Year: 2014).*
Redding et al., "Distributed Multi-Agent Persistent Surveillance and Tracking with Health Management", American Institute Aeronautics and Astronautics, AIAA Guidance, Navigation, and Control Conference, 2011, 18 pages.
Richards et al., "Model Predictive Control of Vehicle Maneuvers with Guaranteed Completion Time and Robust Feasibility", American Control Conference, 2003, Proceedings of the 2003, vol. 5, IEEE, 2003, 7 pages.
Park et al., "Agent Technology for Coordinating UAV Target Tracking", Knowledge-Based Intelligent Information and Engineering Systems, Springer Berlin Heidelberg, 2005, 8 pages.
Kuwata et al., "Three Dimensional Receding Horizon Control for UAVs", AIAA Guidance, Navigation, and Control Conference and Exhibit, Aug. 16-19, 2004, 14 pages.
Alighanbari et al., "Filter-Embedded UAV Task Assignment Algorithms for Dynamic Environments", AIAA Guidance, Navigation, and Control Conference and Exhibit, Aug. 16-19, 2004, 15 pages.
Saad et al., "Vehicle Swarm Rapid Prototyping Testbed", American Institute of Aeronautics and Astronautics, Aerospace Conference and AIAA Unmanned . . . Unlimited Conference, 2009, 9 pages.
Richards et al., "Decentralized Model Predictive Control of Cooperating UAVs", $43^{rd}$ IEEE Conference on Decision and Control, vol. 4, IEEE, 2004, 6 pages.
Bertuccelli et al., "Robust Planning for Coupled Cooperative UAV Missions", $43^{rd}$ IEEE Conference on Decision and Control, vol. 3, IEEE, 2004, 8 pages.
Toksoz et al., "Automated Battery Swap and Recharge to Enable Persistent UAV Missions", AIAA Infotech@ Aerospace Conference, 2011, 10 pages.
How et al., "Multi-vehicle Experimental Platform for Distributed Coordination and Control", http://web.mit.edu/people/jhow/durip1.html, Apr. 1, 2004, 4 pages.
Chung Tin, "Robust Multi-UAV Planning in Dynamic and Uncertain Environments", Massachusetts Institute of Technology, 2004, 110 pages.
How et al., "Flight Demonstrations of Cooperative Control for UAV Teams", AIAA $3^{rd}$ "Unmanned Unlimited" Technical Conference, Workshop and Exhibit, Sep. 20-23, 2004, 9 pages.
Wikipedia, "Waze", http://en.wikipedia.org/wiki/Waze, Mar. 30, 2014, 6 pages.
Choi et al., "Information deliver scheme of micro UAVs having limited communication range during tracking the moving target" The Journal of Supercomputing, vol. 66, Issue 2, 2013, pp. 950-972.
Boyd et al., "Convex Optimization", Cambridge University Press, 2004, 730 pages.

* cited by examiner

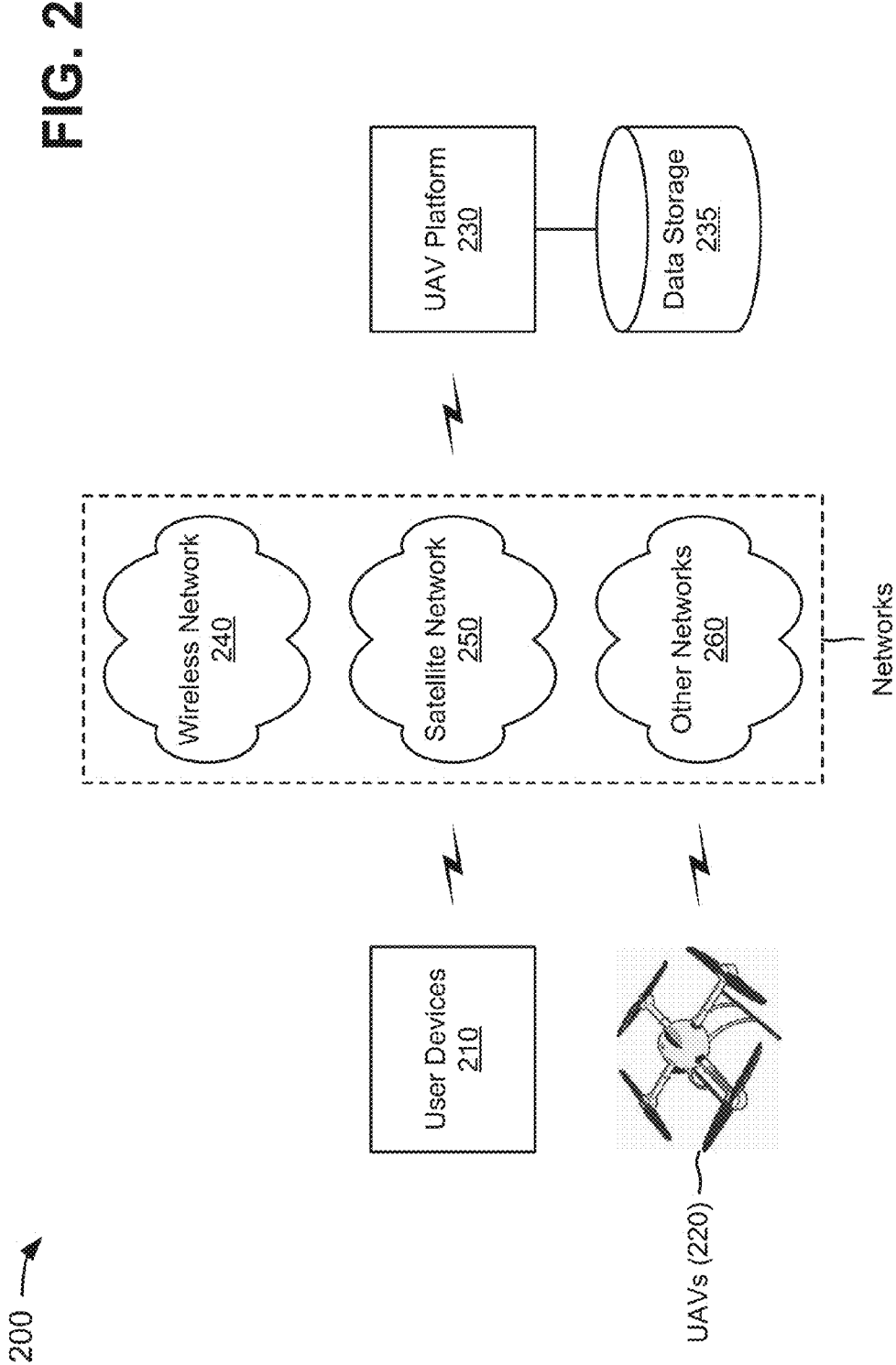

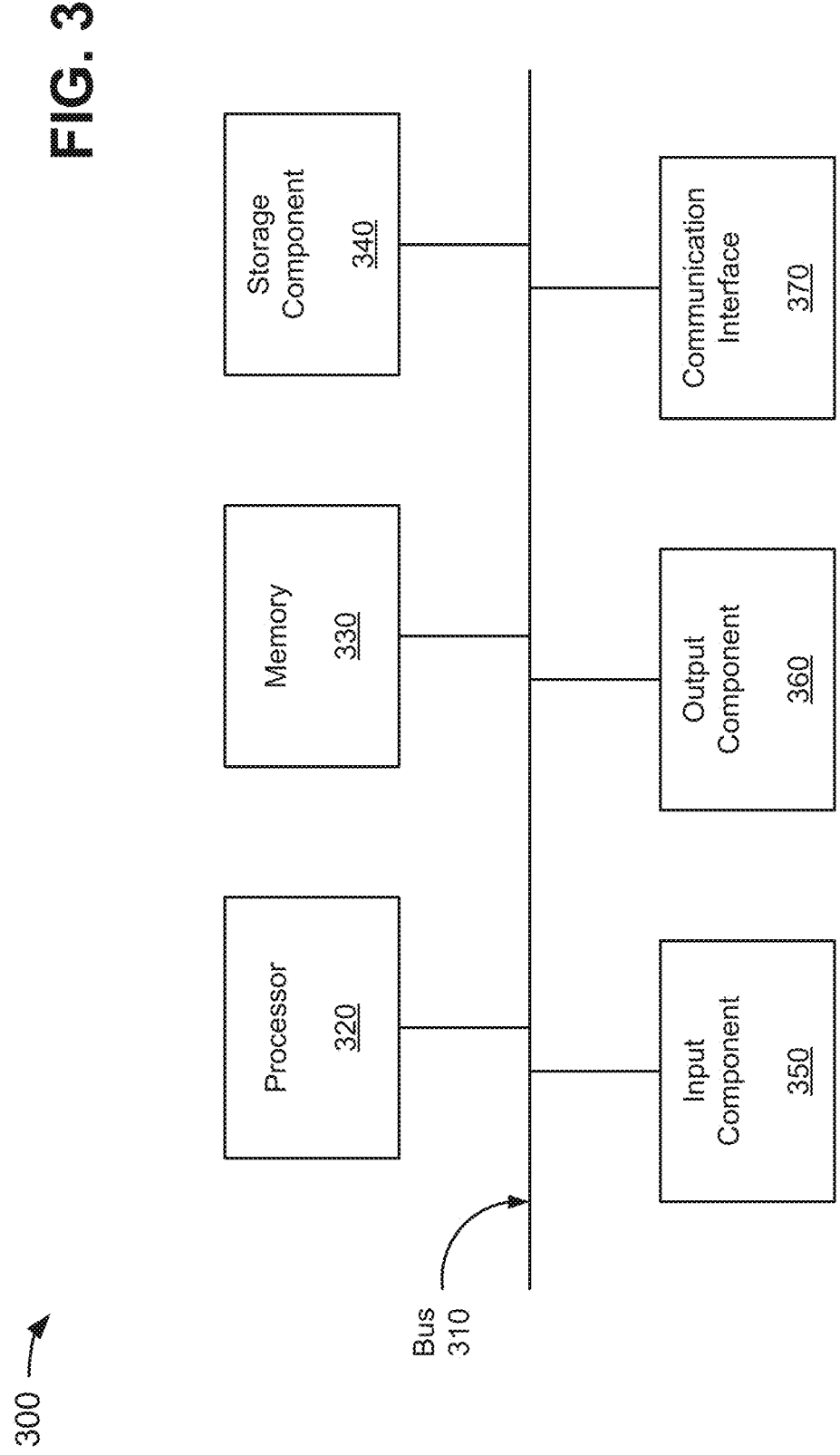

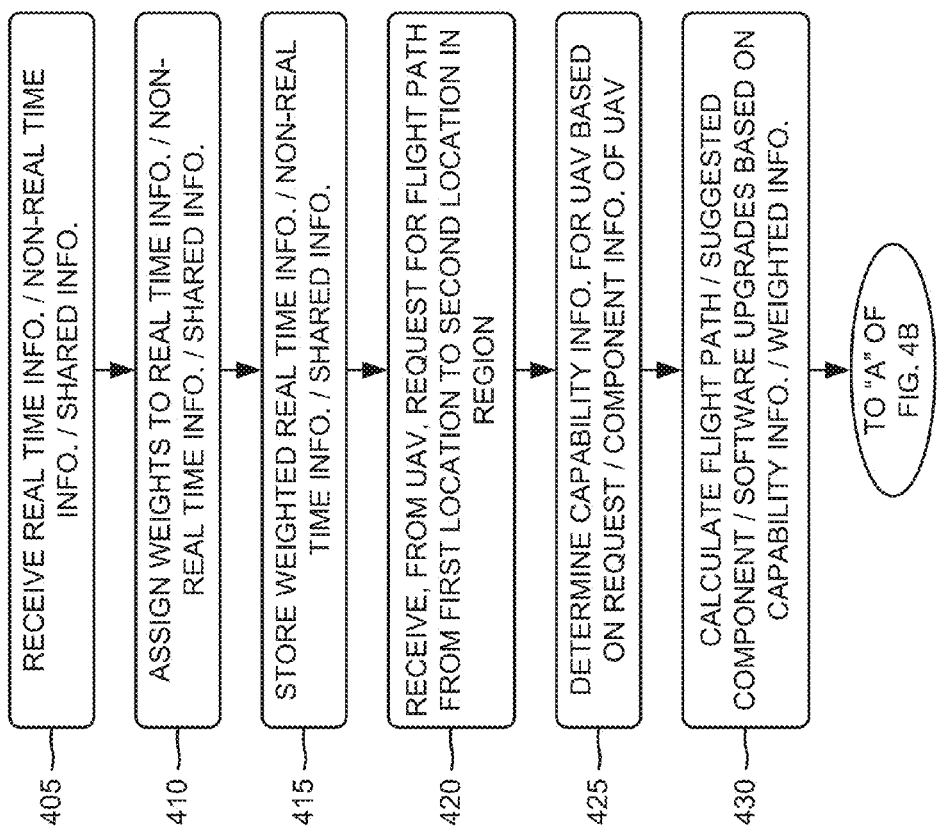

INFORMATION COLLECTION AND COMPONENT/SOFTWARE UPGRADES FOR UNMANNED AERIAL VEHICLES

BACKGROUND

An unmanned aerial vehicle (UAV) is an aircraft without a human pilot aboard. A UAV's flight may be controlled either autonomously by onboard computers or by remote control of a pilot on the ground or in another vehicle. A UAV is typically launched and recovered via an automatic system or an external operator on the ground. There are a wide variety of UAV shapes, sizes, configurations, characteristics, etc. UAVs may be used for a growing number of civilian applications, such as police surveillance, firefighting, security work (e.g., surveillance of pipelines), surveillance of farms, commercial purposes, etc.

BRIEF DESCRIPTION OF THE DRAWINGS

FIG. 2 is a diagram of an example environment in which systems and/or methods described herein may be implemented;

FIG. 3 is a diagram of example components of one or more devices of FIG. 2;

FIGS. 4A and 4B depict a flow chart of an example process for collecting information, suggesting components and/or software, and determining a flight path for a UAV.

DETAILED DESCRIPTION OF PREFERRED EMBODIMENTS

The following detailed description refers to the accompanying drawings. The same reference numbers in different drawings may identify the same or similar elements.

Some private companies propose using UAVs for rapid delivery of lightweight commercial products (e.g., packages), food, medicine, etc. Such proposals for UAVs may need to meet various requirements, such as federal and state regulatory approval, public safety, reliability, individual privacy, operator training and certification, security (e.g., hacking), payload thievery, logistical challenges, etc.

Figure 1A:
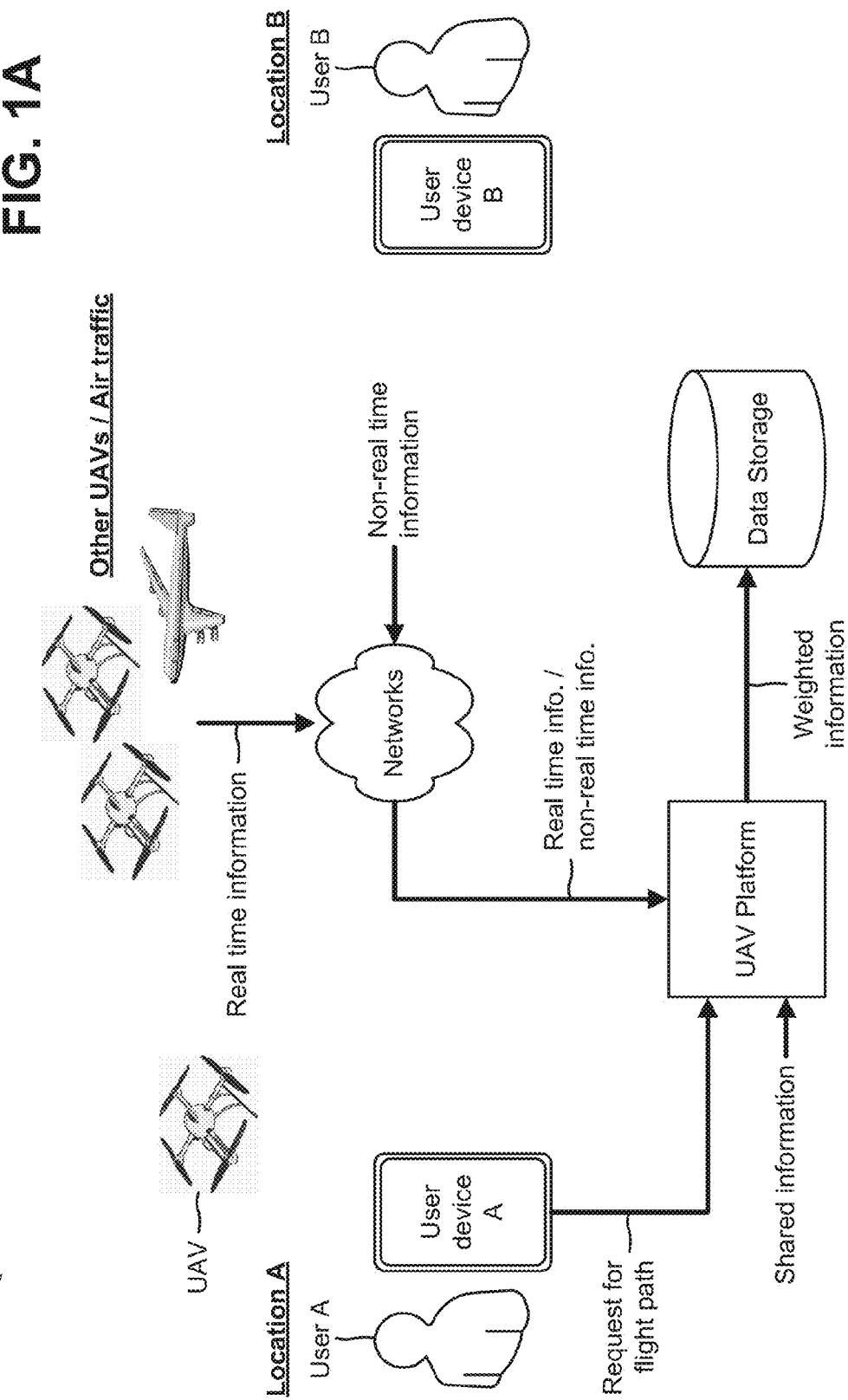
FIGS. 1A and 1B are diagrams of an overview of an example implementation described herein.
Figure 1B:
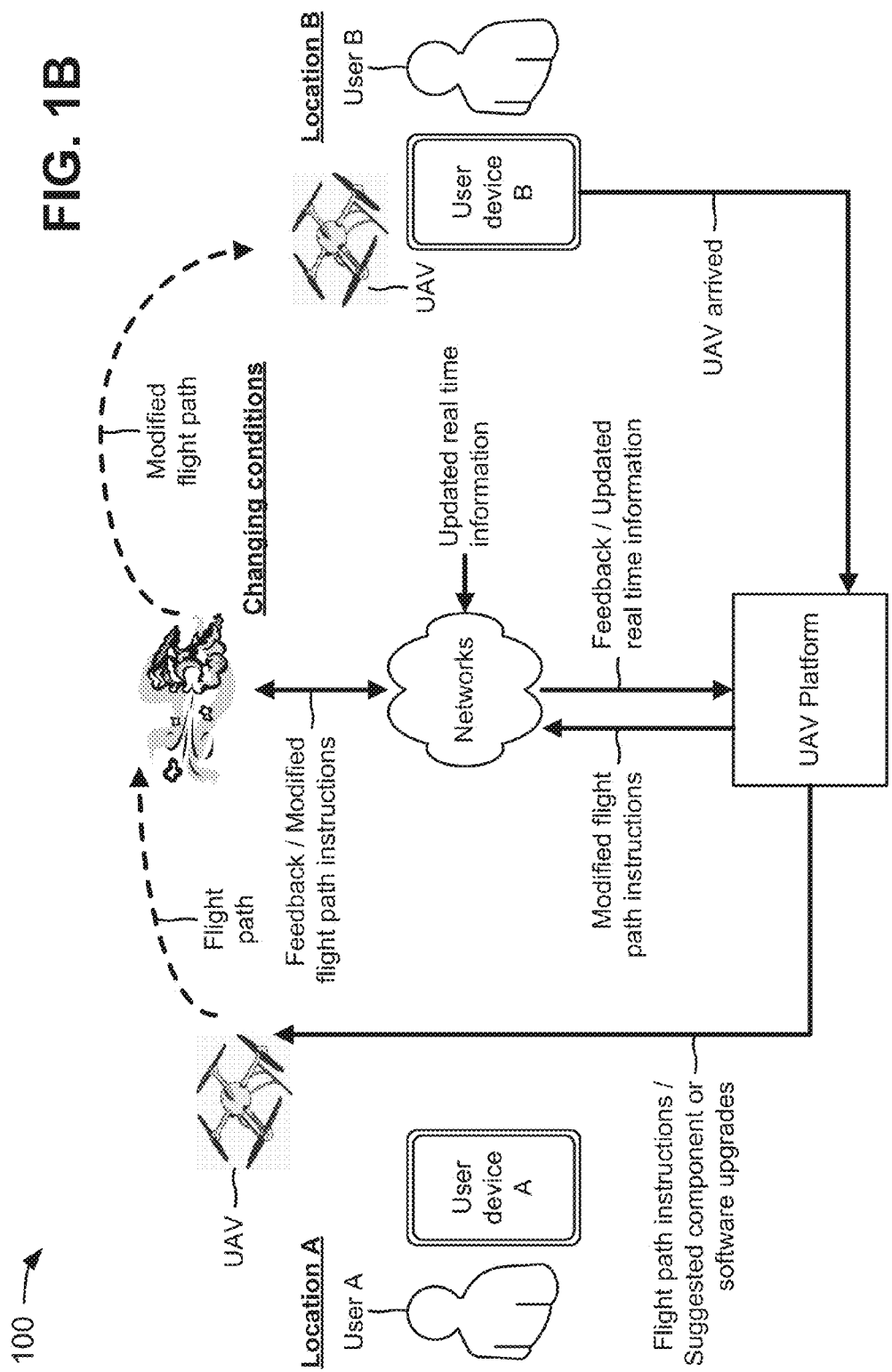

FIGS. 1A and 1B are diagrams of an overview of an example implementation 100 described herein. In example implementation 100, assume that a first user device (e.g., user device A) is associated with a first user (e.g., user A) that is located at an origination location (e.g., location A), as shown in FIG. 1A. Further, assume that user A wants to fly a UAV from location A to a destination location (e.g., location B) in order to deliver a package to a second user (e.g., user B) associated with a second user device (e.g., user device B). As further shown in FIG. 1A, a UAV platform or system may be associated with data storage, and the UAV platform and the data storage may communicate with networks, such as a wireless network, a satellite network, and/or other networks. The networks may provide, to the UAV platform, non-real time information and real time information associated with aviation in a geographical region (e.g., that includes geographical locations of location A, location B, and locations between location A and location B).

The non-real time information may include information that is not provided in real time or near real time, such as capability information associated with UAVs (e.g., thrust, battery life, etc. associated with UAVs); weather information associated with the geographical region (e.g., provided by a national and/or local weather service); air traffic information associated with the geographical region (e.g., provided by a government aviation agency); obstacle information (e.g., buildings, mountains, etc.) associated with the geographical region; regulatory information (e.g., no fly zones, government buildings, etc.) associated with the geographical region; historical information (e.g., former flight paths, former weather, etc.) associated with the geographical region; etc. The real time information may include aviation information that is provided in real time or near-real time, such as weather information, air traffic information, obstacle information, regulatory information, etc. that is provided by other UAVs and/or air traffic (e.g., commercial airplanes, private airplanes, etc.) based on actual conditions encountered and/or sensed by the other UAVs and/or air traffic.

As further shown in FIG. 1A, the UAV platform may receive shared information (e.g., weather information, air traffic information, obstacle information, etc.) from other sources, such as other UAV platforms, owners and/or operators of UAVs, commercial airlines, etc. The UAV platform may assign weights to one or more portions of the real time information, the non-real time information, and/or the shared information. For example, the UAV platform may assign a greater weight to the real time information since the real time information may be more current and/or accurate than the non-real time information and the shared information. The UAV platform may provide the weighted real time information, non-real time information, and shared information to data storage.

As further shown in FIG. 1A, user A may instruct user device A (or the UAV) to generate a request for a flight path (e.g., from location A to location B) for the UAV, and to provide the request to the UAV platform. The request may include credentials (e.g., a serial number, an identifier of a universal integrated circuit card (UICC), etc.) associated with the UAV. The UAV platform may utilize the UAV credentials to determine whether the UAV is authenticated for utilizing the UAV platform and/or one or more of the networks, and is registered with an appropriate authority (e.g., a government agency) for use. For example, the UAV platform may compare the UAV credentials with UAV account information (e.g., information associated with authenticated and registered UAVs) provided in the data storage to determine whether the UAV is authenticated.

The UAV platform may calculate the flight path from location A to location B based on capability information, associated with the UAV, and/or the weighted information, and may generate flight path instructions for the flight path. For example, the flight path instructions may indicate that the UAV is to fly at an altitude of two-thousand (2,000) meters, for fifty (50) kilometers and fifty-five (55) minutes, and then is to fly at an altitude of one-thousand (1,000) meters, for seventy (70) kilometers and one (1) hour in order to arrive at location B. The UAV platform may determine suggested component and/or software upgrades for the UAV based on the capability information and/or the weighted information. For example, the UAV platform may determine that the UAV may more efficiently traverse the flight path with a different battery and/or software that conserves battery power.

As shown in FIG. 1B, the UAV platform may provide, to the UAV, the flight path instructions and the suggested component and/or software upgrades. Assume that user A selects the software that conserves battery power, from the suggested component and/or software upgrades, and that the UAV platform provides the software to the UAV based on the selection. The UAV may install the software so that the UAV conserves battery power. As further shown in FIG. 1B, the UAV may take off from location A, and may travel the flight path based on the flight path instructions.

While the UAV is traveling along the flight path, one or more of the networks may receive updated real time information and/or feedback from the UAV regarding the flight path (e.g., about changing conditions, such as speed, weather conditions, duration, etc.). Assume that the UAV senses changing weather conditions (e.g., a headwind) along the flight path, and provides information about the weather conditions to the UAV platform (e.g., via the feedback). Further, assume that the updated real time information confirms the changing weather conditions. The UAV platform and/or the UAV may calculate a modified flight path that enables the UAV to avoid the headwind, and may generate modified flight path instructions for the modified flight path. The UAV platform may provide the modified flight path instructions to the UAV. The UAV may travel the modified flight path, based on the modified flight path instructions. When the UAV arrives at location B, the UAV and/or user device B may generate a notification indicating that the UAV arrived safely at location B, and may provide the notification to the UAV platform.

Systems and/or methods described herein may provide a platform that enables UAVs to safely traverse flight paths from origination locations to destination locations. The systems and/or methods may enable the platform to utilize real time information, instead of or in addition to non-real time information, which may improve calculations of flight paths. The systems and/or methods may enable UAVs to upgrade components and/or software so that the UAVs may utilize resources more efficiently and/or traverse flight paths more efficiently.

FIG. 2 is a diagram of an example environment 200 in which systems and/or methods described herein may be implemented. As illustrated, environment 200 may include user devices 210, UAVs 220, a UAV platform 230, data storage 235, a wireless network 240, a satellite network 250, and other networks 260. Devices/networks of environment 200 may interconnect via wired connections, wireless connections, or a combination of wired and wireless connections.

User device 210 may include a device that is capable of communicating over wireless network 240 with UAV 220, UAV platform 230, and/or data storage 235. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a global positioning system (GPS) device; a gaming device; or another type of computation and communication device.

UAV 220 may include an aircraft without a human pilot aboard, and may also be referred to as an unmanned aircraft (UA), a drone, a remotely piloted vehicle (RPV), a remotely piloted aircraft (RPA), or a remotely operated aircraft (ROA). In some implementations, UAV 220 may include a variety of shapes, sizes, configurations, characteristics, etc. for a variety of purposes and applications. In some implementations, UAV 220 may include one or more sensors, such as electromagnetic spectrum sensors (e.g., visual spectrum, infrared, or near infrared cameras, radar systems, etc.); biological sensors; chemical sensors; etc. In some implementations, UAV 220 may utilize one or more of the aforementioned sensors to sense (or detect) and avoid an obstacle in or near a flight path of UAV 220.

In some implementations, UAV 220 may include a particular degree of autonomy based on computational resources provided in UAV 220. For example, UAV 220 may include a low degree of autonomy when UAV 220 has few computational resources. In another example, UAV 220 may include a high degree of autonomy when UAV 220 has more computational resources (e.g., built-in control and/or guidance systems to perform low-level human pilot duties, such as speed and flight-path stabilization, scripted navigation functions, waypoint following, etc.). The computational resources of UAV 220 may combine information from different sensors to detect obstacles on the ground or in the air; communicate with one or more of networks 240-260 and/or other UAVs 220; determine an optimal flight path for UAV 220 based on constraints, such as obstacles or fuel requirements; determine an optimal control maneuver in order to follow a given path or go from one location to another location; regulate a trajectory of UAV 220; etc. In some implementations, UAV 220 may include a variety of components, such as a power source (e.g., an internal combustion engine, an electric battery, a solar-powered battery, etc.); a component that generates aerodynamic lift force (e.g., a rotor, a propeller, a rocket engine, a jet engine, etc.); computational resources; sensors; etc.

UAV platform 230 may include one or more personal computers, one or more workstation computers, one or more server devices, one or more virtual machines (VMs) provided in a cloud computing network, or one or more other types of computation and communication devices. In some implementations, UAV platform 230 may be associated with a service provider that manages and/or operates wireless network 240, satellite network 250, and/or other networks 260, such as, for example, a telecommunication service provider, a television service provider, an Internet service provider, etc.

In some implementations, UAV platform 230 may receive real time information, non-real time information, and shared information, may assign weights to the received information, and may store the weighted information. UAV platform 230 may receive, from UAV 220, a request for a flight path from an origination location to a destination location, and may determine capability information for UAV 220 based on the request and/or component information associated with UAV 220. UAV platform 230 may calculate the flight path and suggested component and/or software upgrades for UAV 220 based on the capability information and/or the weighted information. UAV platform 230 may generate flight path instructions for the flight path, and may provide the flight path instructions and the suggested component and/or software upgrades to UAV 220. UAV platform 230 may receive feedback from UAV 220, and updated real time information, during traversal of the flight path by UAV 220. UAV platform 230 may modify the flight path instructions based on the feedback and/or the updated real time information, and may provide the modified flight path instructions to UAV 220. UAV platform 230 may receive a notification that UAV 220 arrived at the destination location when UAV 220 lands at the destination location.

In some implementations, UAV platform 230 may authenticate one or more users, associated with user device 210 and/or UAV 220, for utilizing UAV platform 230, and may securely store authentication information associated with the one or more users. In some implementations, UAV platform 230 may adhere to requirements to ensure that UAVs 220 safely traverse flight paths, and may limit the flight paths of UAVs 220 to particular safe zones (e.g., particular altitudes, particular geographical locations, particular geo-fencing, etc.) to further ensure safety.

Data storage 235 may include one or more storage devices that store information in one or more data structures, such as databases, tables, lists, trees, etc. In some implementations, data storage 235 may store information, such as UAV account information (e.g., serial numbers, model numbers, user names, etc. associated with UAVs 220); capability information associated with UAVs 220 (e.g., thrust, battery life, etc. associated with UAVs 220); weather information associated with a geographical region (e.g., precipitation amounts, wind conditions, etc.); air traffic information associated with the geographical region (e.g., commercial air traffic, other UAVs 220, etc.); obstacle information (e.g., buildings, mountains, towers etc.) associated with the geographical region; regulatory information (e.g., no fly zones, government buildings, etc.) associated with the geographical region; historical information (e.g., former flight paths, former weather conditions, etc.) associated with the geographical region; etc. In some implementations, data storage 235 may be included within UAV platform 230.

Wireless network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN), and may include one or more base stations (e.g., cell towers). The EPC network may include an all-Internet protocol (IP) packet-switched core network that supports high-speed wireless and wireline broadband access technologies. The EPC network may allow user devices 210 and/or UAVs 220 to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching. In some implementations, wireless network 240 may provide location information (e.g., latitude and longitude coordinates) associated with user devices 210 and/or UAVs 220. For example, wireless network 240 may determine a location of user device 210 and/or UAV 220 based on triangulation of signals, generated by user device 210 and/or UAV 220 and received by multiple cell towers, with prior knowledge of the cell tower locations.

Satellite network 250 may include a space-based satellite navigation system (e.g., a global positioning system (GPS)) that provides location and/or time information in all weather conditions, anywhere on or near the Earth where there is an unobstructed line of sight to four or more satellites (e.g., GPS satellites). In some implementations, satellite network 250 may provide location information (e.g., GPS coordinates) associated with user devices 210 and/or UAVs 220, enable communication with user devices 210 and/or UAVs 220, etc.

Each of other networks 260 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4B:

FIGS. 4A and 4B depict a flow chart of an example process 400 for collecting information, suggesting components and/or software, and determining a flight path for a UAV. In some implementations, one or more process blocks of FIGS. 4A and 4B may be performed by UAV platform 230. In some implementations, one or more process blocks of FIGS. 4A and 4B may be performed by another device or a group of devices separate from or including UAV platform 230, such as user device 210 and/or UAV 220.

As shown in FIG. 4A, process 400 may include receiving real time information, non-real time information, and/or shared information (block 405). For example, UAV platform 230 may receive real time information, non-real time information, and/or shared information from one or more of networks 240-260. In some implementations, the non-real time information may include information that is not provided in real time or near real time, such as capability information associated with UAVs 220 (e.g., thrust, battery life, etc. associated with UAVs); weather information associated with a geographical region; air traffic information associated with the geographical region; obstacle information (e.g., buildings, mountains, etc.) associated with the geographical region; regulatory information (e.g., no fly zones, government buildings, etc.) associated with the geographical region; historical information (e.g., former flight paths, former weather, etc.) associated with the geographical region; etc.

In some implementations, the non-real time weather information may be provided by a web site (e.g., www.noaa.gov, www.weather.com, etc.) and/or another source that provides information generated by a national weather service, a local weather service (e.g., a web site associated with a local news channel), a satellite network that provides weather information, etc. In some implementations, the non-real time air traffic information may be provided by a web site (e.g., www.faa.gov) and/or another source that provides information generated by a government aviation agency, a satellite network that provides air traffic information, etc. In some implementations, the non-real time obstacle information may be provided by a web site (e.g., www.usgs.gov) and/or another source that provides information generated by a government geological agency, a web site and/or another source that provides a listing of building heights and locations, etc. In some implementations, the non-real time regulatory information may be provided by a web site (e.g., www.faa.gov) and/or another source that provides information generated by a government regulatory agency or a local regulatory agency, a web site and/or another source that provides restricted, prohibited, and/or controlled airspace information, etc. In some implementations, the non-real time historical information may be provided by a web site and/or another source that provides information associated with historical flight paths between geographical locations, historical weather conditions, historical air traffic information, etc.

In some implementations, the real time information may include information that is provided in real time or near-real time, such as weather information, air traffic information, obstacle information, regulatory information, etc. that is provided by other UAVs 220 and/or air traffic (e.g., commercial airplanes, private airplanes, weather balloons, etc.) based on actual conditions encountered and/or sensed by the other UAVs 220 and/or air traffic. For example, the other UAVs 220 and/or air traffic may be equipped with sensors that detect weather information in a particular geographical region; unforeseen obstacles (e.g., cranes in a construction area, scaffolding in a construction area, a structure of a new high rise building, etc.) in the particular geographical region; dangerous locations (e.g., where UAVs 220 have been hijacked or damaged) in the particular geographical region; unexpected air traffic (e.g., private UAVs 220, private airplanes, private balloons, weather balloons, etc.) in the particular geographical region; etc.

The shared information may include information (e.g., weather information, air traffic information, obstacle information, etc.) that is shared by other sources, such as other UAV platforms, owners and/or operators of UAVs 220 not associated with UAV platform 230, commercial airlines (e.g., that collect information from airplane sensors), etc. For example, the other UAV platforms may provide shared information received from UAVs 220 associated with the other UAV platforms. In another example, UAVs 220 associated with other UAV platforms may be equipped with sensors that detect weather information, unforeseen obstacles, dangerous locations, unexpected air traffic, etc. in a particular geographical region. In still another example, a commercial airline may manage airplanes equipped with sensors that detect weather information, unforeseen obstacles, dangerous locations, unexpected air traffic, etc. in a particular geographical region.

In some implementations, the other sources may provide the shared information to UAV platform 230 in exchange for something of value (e.g., money, utilizing information generated by UAV platform 230, etc.). In some implementations, the other sources may utilize information received and/or generated by UAV platform 230 (e.g., in exchange for the shared information) in order to improve flight paths calculated by the other sources for UAVs 220. In some implementations, the other sources may include trusted owners or operators of UAVs 220 that provide the shared information in order to improve flight paths calculated by UAV platform 230. In some implementations, the other sources may include volunteer operators of UAVs 220 that fly UAVs 220 in order to generate the shared information and provide the shared information to UAV platform 230. In some implementations, UAV platform 230 may provide, to the other sources, a user interface that enables the other sources to provide the shared information to UAV platform 230 and/or to validate information received and/or generated by UAV platform 230. For example, the user interface may enable the other sources to delete or correct inaccurate information received and/or generated by UAV platform 230, validate information received and/or generated by UAV platform 230, etc.

In some implementations, UAV platform 230 may receive real time information, non-real time information, and/or shared information, associated with a particular geographical region, based on a time of day. For example, assume that it is a morning rush hour in a first geographical region (e.g., with a lot of air traffic) and predawn in a second geographical region (e.g., with very little air traffic). In such an example, UAV platform 230 may receive more real time information, non-real time information, and/or shared information associated with the first geographical region, rather than the second geographical region, since more air traffic is occurring during the morning rush hour in the first geographical region. Later in the morning (e.g., when the morning rush occurs in the second geographical region), UAV platform 230 may receive more real time information, non-real time information, and/or shared information associated with the second geographical region, rather than the first geographical region.

In some implementations, UAV platform 230 may receive real time information, non-real time information, and/or shared information, associated with a particular geographical region, based on air traffic congestion in the particular geographical region. For example, assume that a city includes a large amount of air traffic and that a farm includes very little air traffic. In such an example, UAV platform 230 may receive more real time information, non-real time information, and/or shared information associated with the city, rather than the farm, since a greater amount of air traffic is occurring in the city.

In some implementations, UAV platform 230 may receive real time information, non-real time information, and/or shared information, associated with a particular geographical region, based on special circumstances occurring in the particular geographical region. For example, assume that the particular geographical region includes unforeseen obstacles (e.g., a crane constructing a new building, a structure of a new high rise building, etc.), is a high risk region (e.g., due to possible hijacking of or damage to UAVs 220), and/or is experiencing unexpected weather conditions (e.g., unexpected wind, rain, sleet, etc.). In such an example, UAV platform 230 may receive more real time information, non-real time information, and/or shared information associated with the particular geographical region since the special circumstances may pose risks to UAVs 220.

In some implementations, UAV platform 230 may estimate and/or normalize one or more of the real time information, the non-real time information, and/or the shared information. For example, assume that UAV platform 230 maintains multiple grid elements (e.g., where each grid element includes a particular area) of information for a geographical region, and that each grid element includes a real time average temperature, wind speed, etc. In some grid elements, UAV platform 230 may receive granular information and in other grid elements UAV platform 230 may receive less detailed information or no information. In such situations, UAV platform 230 may estimate information for a particular grid element based on less detailed information provided from surrounding grid elements and/or based on updates received from UAVs 220 flying in the particular grid element. In some implementations, UAV platform 230 may determine trustworthiness of information based on the last received information. For example, UAV platform 230 may determine the estimated information for the particular grid element, and may assign a trustworthiness value to the estimated information. If UAV platform 230 calculates a flight path based on the estimated information (e.g., indicating that UAV 220 may arrive at a destination location with a 10% battery life), UAV platform 230 may also factor in the trustworthiness of the estimated information (e.g., and less trustworthy estimated information may affect a margin of error when UAV platform 230 calculates the flight path).

As further shown in FIG. 4A, process 400 may include assigning weights to the real time information, the non-real time information, and/or the shared information (block 410). For example, UAV platform 230 may assign weights to the real time information, the non-real time information, and/or the shared information. In some implementations, UAV platform 230 may assign different weights (e.g., values, percentages, etc.) to the real time information, the non-real time information, and/or the shared information. For example, UAV platform 230 may assign greater weights to the real time information (e.g., the real time weather information, the real time air traffic information, the real time obstacle information, and/or the real time regulatory information) than weights assigned to the non-real time information (e.g., the non-real time weather information, the non-real time air traffic information, the non-real time obstacle information, the non-real time regulatory information, and/or the non-real time historical information). In another example, UAV platform 230 may assign greater weights to the shared information (e.g., the shared weather information, the shared air traffic information, the shared obstacle information, the shared regulatory information, and/or the shared historical information) than weights assigned to the non-real time information. However, UAV platform 230 may assign greater weights to the real time information than weights assigned to the shared information.

In some implementations, UAV platform 230 may receive an amount of the real time information, the non-real time information, and/or the shared information based on the weights assigned to the real time information, the non-real time information, and/or the shared information. For example, if UAV platform 230 assigns greater weights to the real time information than the weights assigned to the shared information and the non-real time information, UAV platform 230 may receive a greater amount of the real time information than the shared information and the non-real time information. In another example, if UAV platform 230 assigns greater weights to the shared information than the weights assigned to the non-real time information, UAV platform 230 may receive a greater amount of the shared information than the non-real time information.

As further shown in FIG. 4A, process 400 may include storing the weighted real time information, the weighted non-real time information, and/or the weighted shared information (block 415). For example, UAV platform 230 may store the weighted real time information, the weighted non-real time information, and/or the weighted shared information in one or more data structures (e.g., tables, lists, databases, etc.) provided in memory (e.g., memory 330 and/or storage component 340, FIG. 3) associated with UAV platform 230. In some implementations, UAV platform 230 may store the weighted real time information, the weighted non-real time information, and/or the weighted shared information in one or more data structures provided in data storage 235.

As further shown in FIG. 4A, process 400 may include receiving, from a UAV, a request for a flight path from a first location to a second location in a particular region (block 420). For example, UAV platform 230 may receive, from UAV 220, a request for a flight path from a first location to a second location in a particular region. In some implementations, user device 210 may provide information associated with the flight path to UAV 220, and UAV 220 may provide the request for the flight path to UAV platform 230. In some implementations, the request for the flight path may be provided by user device 210 to UAV platform 230. In some implementations, the request for the flight path may include a request for flight path instructions from an origination location (e.g., a current location of UAV 220) to a destination location (e.g., a location in the particular region). The origination location and the destination location may be provided in the particular region.

As further shown in FIG. 4A, process 400 may include determining capability information for the UAV based on the request and component information of the UAV (block 420). For example, UAV platform 230 may determine capability information for UAV 220 based on the request for the flight path and component information of UAV 220 (e.g., provided with the request for the flight path). In some implementations, data storage 235 may include capability information associated with different components of UAVs 220, such as battery life, thrusts provided by rotors, flight times associated with amounts of fuel, etc. In some implementations, UAV platform 230 may utilize the component information of UAV 220 (e.g., UAV 220 has a particular type of battery, engine, rotors, etc.) to retrieve the capability information for components of UAV 220 from data storage 235. For example, if UAV 220 has a particular type of battery and a particular type of rotor, UAV platform 230 may determine that the particular type of battery of UAV 220 may provide two hours of flight time and that the particular type of rotor may enable UAV 220 to reach an altitude of one-thousand meters.

In some implementations, UAVs 220 may be required to follow a maintenance schedule (e.g., for safety purposes), and may need to be certified (e.g., by a government agency) that the maintenance schedule is followed. Such information may be provided in data storage 235 (e.g., with the capability information). In some implementations, UAV platform 230 may deny the request for the flight path if UAV platform 230 determines that UAV 220 has not properly followed the maintenance schedule. This may enable UAV platform 230 to ensure that only properly maintained UAVs 220 are permitted to fly, which may increase safety associated with UAVs 220 utilizing airspace.

As further shown in FIG. 4A, process 400 may include calculating the flight path and suggested component and/or software upgrades for the UAV based on the capability information, the weighted real time information, the weighted non-real time information, and/or the weighted shared information (block 430). For example, UAV platform 230 may calculate the flight path from the origination location to the destination location based on the capability information, the weighted real time information, the weighted non-real time information, and/or the weighted shared information stored in UAV platform 230 and/or data storage 235. In some implementations, UAV platform 230 may determine whether the capability information indicates that UAV 220 may safely complete the flight path from the origination location to the destination location without stopping. If UAV platform 230 determines that UAV 220 cannot safely complete the flight path from the origination location to the destination location without stopping (e.g., to recharge or refuel), UAV platform 230 may determine one or more waypoints along the flight path where UAV 220 may stop and recharge or refuel.

In some implementations, UAV platform 230 may calculate the flight path based on the capability information associated with UAV 220 and the weather information provided by the weighted real time information, the weighted non-real time information, and/or the weighted shared information. For example, UAV platform 230 may determine that, without weather issues, the flight path may take UAV 220 two hours to complete at an altitude of five-hundred meters. UAV platform 230 may further determine that wind conditions at five-hundred meters may create a headwind of fifty kilometers per hour on UAV 220, but that wind conditions at one-thousand meters may create a tailwind of fifty kilometers per hour on UAV 220. In such an example, UAV platform 230 may alter the flight path from an altitude of five-hundred meters to an altitude of one-thousand meters (e.g., if UAV 220 is capable of reaching the altitude of one-thousand meters). Assume that the tailwind at the altitude of one-thousand meters decreases the flight time from two hours to one hour and thirty minutes. Alternatively, UAV platform 230 may not alter the flight path, but the headwind at the altitude of five-hundred meters may increase the flight time from two hours to two hours and thirty minutes.

Additionally, or alternatively, UAV platform 230 may calculate the flight path based on the capability information associated with UAV 220 and the air traffic information provided by the weighted real time information, the weighted non-real time information, and/or the weighted shared information. For example, UAV platform 230 may determine that, without air traffic issues, the flight path may take UAV 220 two hours to complete at an altitude of five-hundred meters. UAV platform 230 may further determine that other UAVs 220 are flying at the altitude of five-hundred meters based on the air traffic information, but that no other UAVs 220 are flying at an altitude of one-thousand meters. In such an example, UAV platform 230 may alter the flight path from an altitude of five-hundred meters to an altitude of one-thousand meters. The altitude of one-thousand meters may enable UAV 220 to safely arrive at the location without the possibility of colliding with other UAVs 220. Alternatively, UAV platform 230 may not alter the flight path, but the other UAVs 220 flying at the altitude of five-hundred meters may increase possibility that UAV 220 may collide with another UAV 220. UAV platform 230 may then determine whether UAV 220 is capable of safely flying at the altitude of five-hundred meters without colliding with another UAV 220.

Additionally, or alternatively, UAV platform 230 may calculate the flight path based on the capability information associated with UAV 220 and the obstacle information provided by the weighted real time information, the weighted non-real time information, and/or the weighted shared information. For example, UAV platform 230 may determine that, without obstacle issues, the flight path may take UAV 220 one hour to complete at an altitude of two-hundred meters. UAV platform 230 may further determine that one or more buildings are two-hundred meters in height based on the obstacle information, but that no other obstacles are greater than two-hundred meters in height. In such an example, UAV platform 230 may alter the flight path from an altitude of two-hundred meters to an altitude of three-hundred meters. The altitude of three-hundred meters may enable UAV 220 to safely arrive at the location without the possibility of colliding with the one or more buildings. Alternatively, UAV platform 230 may not alter the altitude of the flight path, but may change the flight path to avoid the one or more buildings, which may increase the flight time from one hour to one hour and thirty minutes.

Additionally, or alternatively, UAV platform 230 may calculate the flight path based on the capability information associated with UAV 220 and the regulatory information provided by the weighted real time information, the weighted non-real time information, and/or the weighted shared information. For example, UAV platform 230 may determine that, without regulatory issues, the flight path may take UAV 220 one hour to complete at an altitude of five-hundred meters. UAV platform 230 may further determine that the flight path travels over a restricted facility based on the regulatory information. In such an example, UAV platform 230 may change the flight path to avoid flying over the restricted facility, which may increase the flight time from one hour to one hour and thirty minutes.

Additionally, or alternatively, UAV platform 230 may calculate the flight path based on the capability information associated with UAV 220 and the historical information provided by the weighted non-real time information and/or the weighted shared information. For example, UAV platform 230 may identify prior flight paths to the location from the historical information, and may select one of the prior flight paths, as the flight path, based on the capability information associated with UAV 220. For example, assume that UAV platform 230 identifies three prior flight paths that include flight times of two hours, three hours, and four hours, respectively, and may determine that UAV 220 may safely fly for two hours and thirty minutes (e.g., based on the capability information). In such an example, UAV platform 230 may select, as the flight path, the prior flight path with the flight time of two hours.

In some implementations, UAV platform 230 may determine multiple flight paths between the origination location and the destination location based on the capability information, the weighted real time information, the weighted non-real time information, and/or the weighted shared information. In some implementations, UAV platform 230 may calculate a score for each of the flight paths based on the weights assigned to the real time information, the non-real time information, and/or the shared information. In some implementations, UAV platform 230 may assign weights to the capability information, and may utilize the weights assigned to the capability information to calculate the score for each of the flight paths. In some implementations, UAV platform 230 may rank the flight paths based on the scores (e.g., in ascending order, descending order, etc.), and may select the flight path based on the ranked flight paths. For example, assume that UAV platform 230 assigns a weight of 0.8 to the real time information, a weight of 0.3 to the non real time information, and a weight of 0.5 to the shared information. Further, assume that UAV platform 230 determines three flight paths (e.g., A, B, and C) between the origination location and the destination location based on the assigned weights, and calculates a score of 0.8 for flight path A, a score of 0.6 for flight path B, and a score of 0.7 for flight path C. UAV platform 230 may rank the flight paths based on the scores (e.g., as A, C, and B), and may select flight path A as the flight path based on the ranking (e.g., since flight path A has the greatest score).

In some implementations, UAV platform 230 may determine suggested component and/or software upgrades for UAV 220 based on the capability information, the weighted real time information, the weighted non-real time information, and/or the weighted shared information. In some implementations, the component upgrades may include additional sensors (e.g., cameras, anemometers, etc.), upgraded rotors, upgraded batteries, upgraded engines, etc. that may be utilized by UAV 220. In some implementations, software upgrades may include upgraded operating system software, applications that cause UAV 220 to perform particular functions, software to improve the efficiency of UAV 220, etc. For example, if UAV 220 is to perform a surveillance mission at night and does not include an infrared (IR) sensor, UAV platform 230 may determine that UAV 220 should purchase or rent an IR sensor for the surveillance mission. UAV platform 230 may further determine that UAV 220 should include software to control the IR sensor. In another example, if UAV 220 is to fly a package in a very windy region and does not include an anemometer, UAV platform 230 may determine that UAV 220 should purchase or rent an anemometer for the flight, and include software to control the anemometer.

In some implementations, UAV platform 230 may determine multiple component and/or software upgrades based on the capability information, the weighted real time information, the weighted non-real time information, and/or the weighted shared information. In some implementations, UAV platform 230 may calculate a score for each of the component/software upgrades based on the weights assigned to the real time information, the non-real time information, and/or the shared information. In some implementations, UAV platform 230 may assign weights to the capability information, and may utilize the weights assigned to the capability information to calculate the score for each of the component/software upgrades. In some implementations, UAV platform 230 may rank the component/software upgrades based on the scores (e.g., in ascending order, descending order, etc.), and may select one or more component/software upgrades to suggest to a user of UAV 220 based on the ranked component/software upgrades. For example, assume that UAV platform 230 assigns a weight of 0.9 to the real time information, a weight of 0.4 to the non real time information, and a weight of 0.6 to the shared information. Further, assume that UAV platform 230 determines three component/software upgrades (e.g., D, E, and F) based on the assigned weights, and calculates a score of 0.9 for component/software upgrade D, a score of 0.5 for component/software upgrade E, and a score of 0.6 for component/software upgrade F. UAV platform 230 may rank the component/software upgrades based on the scores (e.g., as D, F, and E), and may select component/software upgrades D and F to suggest to the user of UAV 220 based on the ranking (e.g., since component/software upgrades D and F have the greatest scores).

As shown in FIG. 4B, process 400 may include generating flight path instructions for the flight path (block 435). For example, UAV platform 230 may generate flight path instructions for the flight path. In some implementations, the flight path instructions may include specific altitudes for UAV 220 between fixed geographic coordinates (e.g., a first location and a second location); navigational information (e.g., travel east for three kilometers, then north for two kilometers, etc.); expected weather conditions (e.g., headwinds, tailwinds, temperatures, etc.); network information (e.g., locations of base stations of wireless network 240); timing information (e.g., when to take off, when to perform certain navigational maneuvers, etc.); waypoint information (e.g., locations where UAV 220 may stop and recharge or refuel); etc. For example, the flight path instructions may include information that instructs UAV 220 to fly forty-five degrees northeast for ten kilometers at an altitude of five-hundred meters, fly three-hundred and fifteen degrees northwest for ten kilometers at an altitude of four-hundred meters, etc.

As further shown in FIG. 4B, process 400 may include providing the flight path instructions and the suggested component and/or software upgrades to the UAV (block 440). For example, UAV platform 230 may provide the flight path instructions, and information associated with the suggested component and/or software upgrades, to UAV 220. In some implementations, the information associated with the suggested component and/or software upgrades may be provided to user device 210 instead or in addition to UAV 220. In some implementations, the information associated with the suggested component and/or software upgrades may include a user interface that provides images, information, sale prices, rental prices, specifications, etc. associated with the suggested component and/or software upgrades.

In some implementations, UAV 220 may utilize the flight path instructions to travel via the flight path. For example, UAV 220 may take off at a time specified by the flight path instructions, may travel a route and at altitudes specified by the flight path instructions, may detect and avoid any obstacles encountered in the flight path, etc. until UAV 220 arrives at the destination location.

In some implementations, if UAV 220 includes sufficient computational resources (e.g., a sufficient degree of autonomy), UAV 220 may utilize information provided by the flight path instructions to calculate a flight path for UAV 220 and to generate flight path instructions. In such implementations, the flight path instructions provided by UAV platform 230 may include less detailed information, and UAV 220 may determine more detailed flight path instructions via the computational resources of UAV 220.

As further shown in FIG. 4B, process 400 may include receiving feedback from the UAV, and updated real time information, during traversal of the flight path by the UAV (block 445). For example, while UAV 220 is traveling along the flight path in accordance with the flight path instructions, UAV 220 may provide feedback to UAV platform 230 via one or more of networks 240-260, and UAV platform 230 may receive the feedback. In some implementations, the feedback may include information received by sensors of UAV 220, such as visual information received from electromagnetic spectrum sensors of UAV 220 (e.g., images of obstacles), temperature information, wind conditions, etc. In some implementations, UAV 220 may utilize such feedback to detect and avoid any unexpected obstacles encountered by UAV 220 during traversal of the flight path. For example, if UAV 220 detects another UAV 220 in the flight path, UAV 220 may alter the flight path to avoid colliding with the other UAV 220.

In some implementations, while UAV 220 is traveling along the flight path in accordance with the flight path instructions, UAV platform 230 may receive updated real time information associated with a geographical region of the flight path. For example, other UAVs 220 and/or airplanes in the geographical region may continuously provide updated real time information (e.g., weather information, air traffic information, etc.) to UAV platform 230. In some implementations, the updated real time information may include real time weather conditions (e.g., wind conditions, precipitation conditions, etc.) in the geographical region; real time air traffic conditions (e.g., changing flight paths of UAVs 220 and/or airplanes due to weather conditions) in the geographical region; real time obstacle conditions (e.g., a crane in a construction area, a new structure for a high rise building, etc.) in the geographical region; etc.

As further shown in FIG. 4B, process 400 may include determining whether to modify the flight path based on the feedback and/or the updated real time information (block 450). For example, UAV platform 230 may determine whether to modify the flight path based on the feedback and/or the updated real time information. In some implementations, UAV platform 230 may determine to not modify the flight path if the feedback and/or the updated real time information indicate that UAV 220 will safely arrive at the destination location. In some implementations, UAV platform 230 may determine to modify the flight path if the feedback and/or the updated real time information indicate that UAV 220 is in danger of colliding with an obstacle (e.g., another UAV 220, a building, an airplane, etc.). In such implementations, UAV platform 230 may modify the flight path so that UAV 220 avoids colliding with the obstacle and/or remains a safe distance from the obstacle.

In some implementations, UAV platform 230 may determine to modify the flight path if the feedback and/or the updated real time information indicate that the weather conditions may prevent UAV 220 from reaching the destination location. For example, the wind conditions may change and cause the flight time of UAV 220 to increase to a point where the battery of UAV 220 will be depleted before UAV 220 reaches the destination location. In such an example, UAV platform 230 may modify the flight path so that UAV 220 either stops to recharge or changes altitude to improve wind conditions. In another example, rain or ice may increase the weight of UAV 220 and/or its payload and may cause the battery of UAV 220 to work harder to a point where the battery of UAV 220 will be depleted before UAV 220 reaches the destination location. In such an example, UAV platform 230 may modify the flight path so that UAV 220 stops to recharge before completing the flight path.

As further shown in FIG. 4B, if the flight path is to be modified (block 450—YES), process 400 may include generating modified flight path instructions based on the feedback and/or the updated real time information (block 455). For example, if UAV platform 230 determines that the flight path is be modified, UAV platform 230 may modify the flight path based on the feedback and/or the updated real time information (e.g., as described above). In some implementations, UAV platform 230 may generate modified flight path instructions for the modified flight path based on the feedback and/or the updated real time information. In some implementations, the modified flight path instructions may modify the flight path instructions based on the feedback and/or the updated real time information. For example, the flight path instructions may be modified so that UAV 220 avoids colliding with an obstacle and/or remains a safe distance from the obstacle, stops to recharge, changes altitude to improve wind conditions, etc.

As further shown in FIG. 4B, process 400 may include providing the modified flight path instructions to the UAV (block 460). For example, UAV platform 230 may provide the modified flight path instructions to UAV 220. In some implementations, UAV 220 may utilize the modified flight path instructions to travel along the modified flight path. For example, UAV 220 may stop and recharge according to the modified flight path instructions, may adjust a route and/or altitudes according to the modified flight path instructions, may detect and avoid any obstacles encountered in the modified flight path, etc. until UAV 220 arrives at the destination location. In some implementations, the feedback and/or the updated real time information may continue to be provided to UAV platform 230 during traversal of the modified flight path by UAV 220, and UAV platform 230 may or may not further modify the flight path based on the further feedback and/or the updated real time information.

As further shown in FIG. 4B, if the flight path is not to be modified (block 450—NO), process 400 may include receiving a notification that the UAV arrived at the second location (block 465). For example, if the feedback and/or the updated real time information indicate that UAV 220 will safely arrive at the destination location, UAV platform 230 may determine that the flight path need not be modified. In some implementations, UAV 220 may continue along the flight path based on the flight path instructions until UAV 220 arrives at the destination location. When UAV 220 arrives at the destination location, UAV 220 may provide a notification to UAV platform 230, via one or more of networks 240-260. In some implementations, the notification may indicate that UAV 220 has safely arrived at the destination location.

Although FIGS. 4A and 4B shows example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5A:
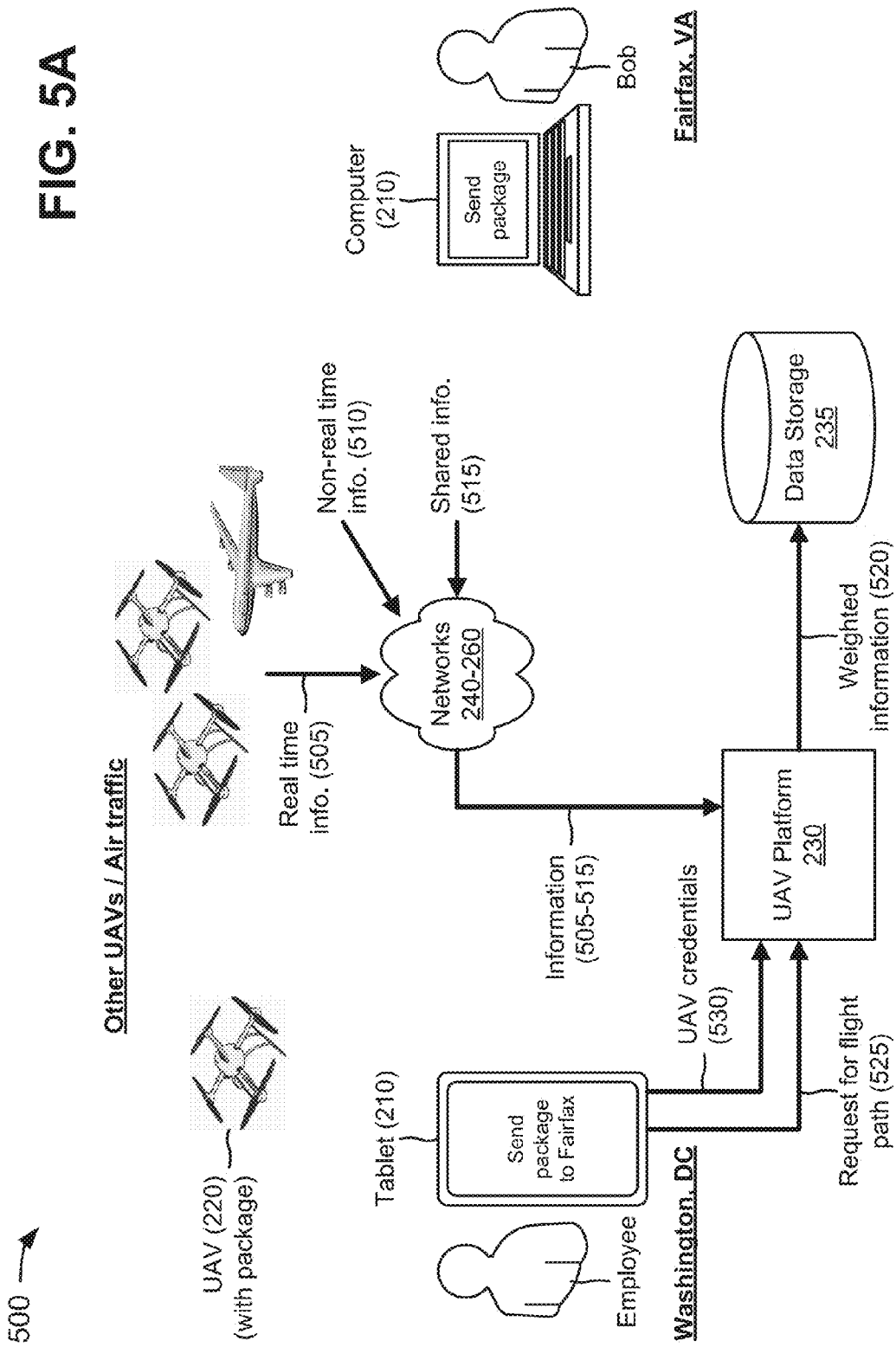
FIGS. 5A-5E are diagrams of an example relating to the example process shown in FIGS. 4A and 4B.

FIGS. 5A-5E are diagrams of an example 500 relating to example process 400 shown in FIGS. 4A and 4B. Assume that a first user device 210 (e.g., a tablet 210) is associated with a first user (e.g., an employee at a delivery company) that is located at an origination location (e.g., Washington, D.C.), as shown in FIG. 5A. Further, assume that a second user device 210 (e.g., a computer 210) is associated with a second user (e.g., Bob) that is located at a destination location (e.g., a hospital in Fairfax, Va.), and that Bob has instructed computer 210 to request delivery of a package to Fairfax, Va. For example, computer 210 may inform tablet 210 (e.g., via one or more servers associated with the delivery company) and the employee that the package is to be delivered to Bob as soon as possible. Further, assume that the employee wants to utilize UAV 220 to fly the package from Washington, D.C. to Fairfax, Va. in order to deliver the package to Bob.

As further shown in FIG. 5A, UAV platform 230 and data storage 235 may communicate with wireless network 240, satellite network 250, and/or other networks 260. Wireless network 240, satellite network 250, and/or other networks 260 may receive, from other UAVs 220 and/or air traffic, real time information 505, such as real time weather information, real time air traffic information, real time obstacle information, real time regulatory information, etc. associated with a geographical region (e.g., that includes a geographical location of Washington, D.C., a geographical location of Fairfax, Va., and geographical locations between Washington and Fairfax). Networks 240-260 may receive non-real time information 510, such as capability information associated with UAV 220, non-real time weather information, non-real time air traffic information, non-real time obstacle information, non-real time regulatory information, non-real time historical information, etc. associated with the geographical location. Networks 240-260 may also receive shared information 515, such as shared weather information, shared air traffic information, shared obstacle information, shared regulatory information, shared historical information, etc. associated with the geographical region. Networks 240-260 may provide information 505-515 to UAV platform 230, as further shown in FIG. 5A.

UAV platform 230 may receive real time information 505, non-real time information, 510, and shared information 515, and may assign different weights to real time information 505, non-real time information, 510, and shared information 515. For example, assume that UAV platform 230 assigns the greatest weight to real time information 505 (e.g., since real time information may be more current and more accurate than non-real time information 510 and shared information 515), assigns a next greatest weight to shared information 515 (e.g., since shared information 515 may be more accurate than non-real time information 510), and assigns the least greatest weight to non-real time information 510. UAV platform 230 may provide the weighted information 505-515 to data storage 235, as indicated by reference number 520.

Figure 5B:
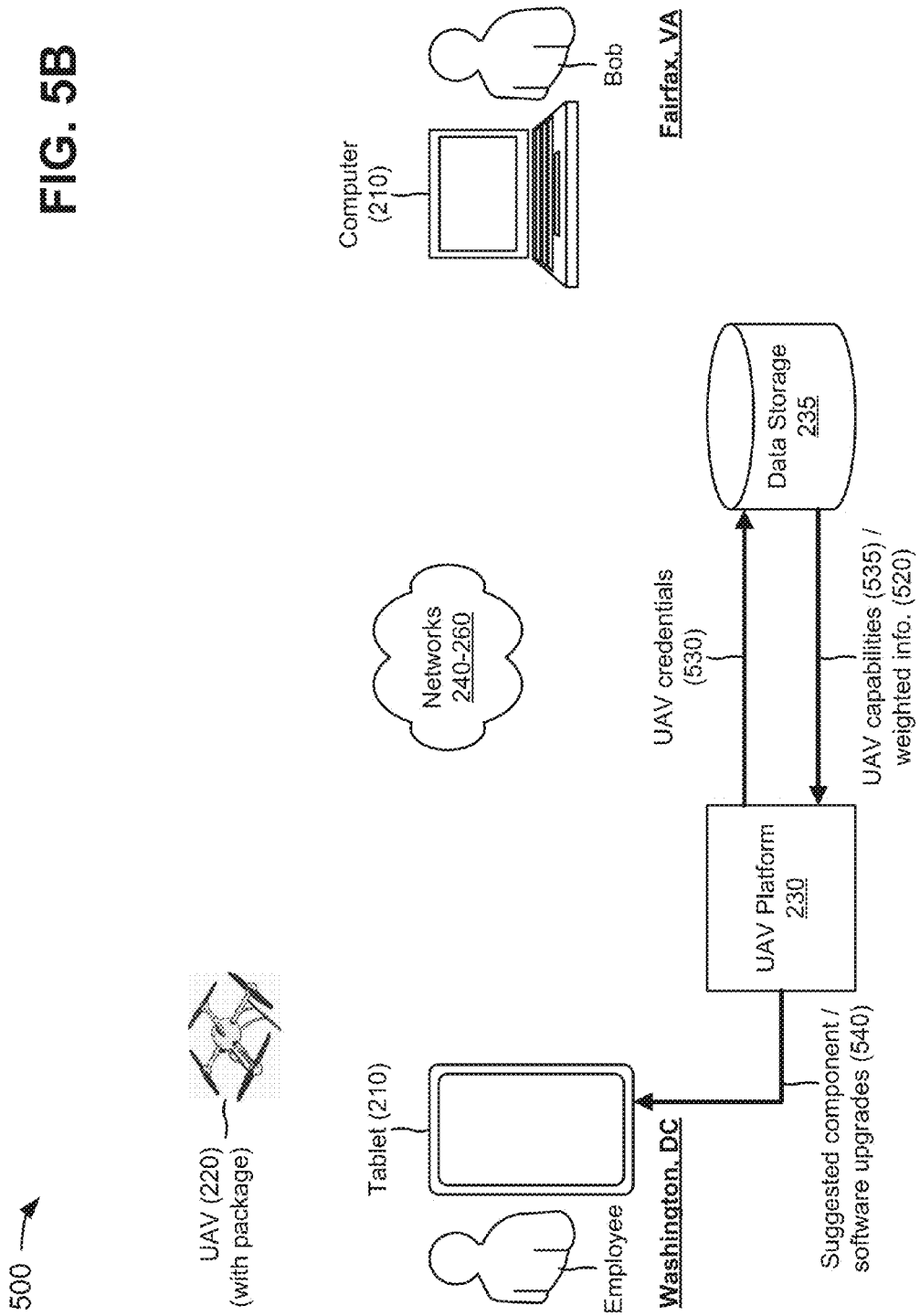

As further shown in FIG. 5A, the employee may instruct tablet 210 (or UAV 220) to generate a request 525 for a flight path (e.g., from Washington, D.C. to Fairfax, Va.) for UAV 220, and to provide request 525 to UAV platform 230. Request 525 may include credentials 530 (e.g., a serial number, an identifier of a UICC, etc. of UAV 220) associated with UAV 220, or credentials 530 may be provided separately from request 525 to UAV platform 230. UAV platform 230 may utilize credentials 530 to determine whether UAV 220 is authenticated for utilizing UAV platform 230 and/or one or more of networks 240-260, and is registered with an appropriate authority for use. For example, UAV platform 230 may compare credentials 530 with information provided in data storage 235 in order to determine whether UAV 220 is authenticated for utilizing UAV platform 230 and/or one or more of networks 240-260, and is registered with an appropriate authority, as shown in FIG. 5B.

Figure 5C:
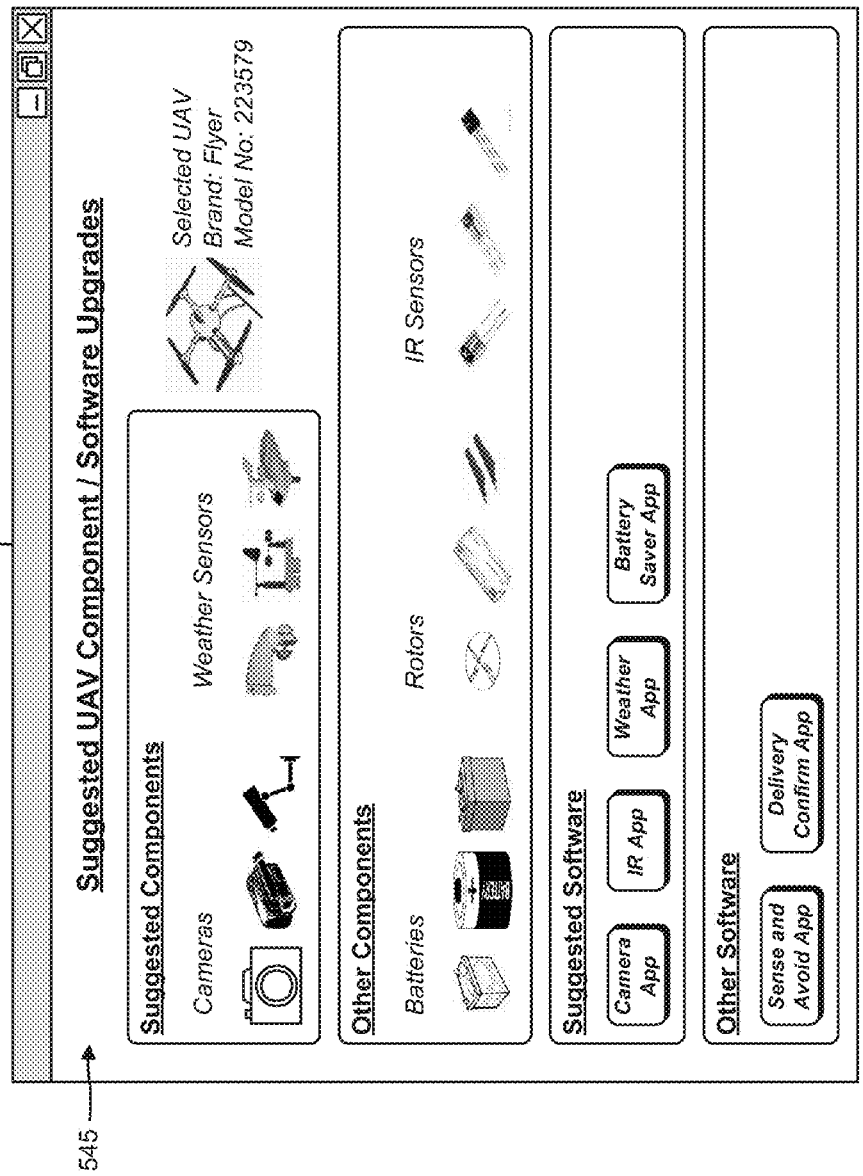

Assume that UAV platform 230 determines that UAV 220 is authenticated for utilizing UAV platform 230 and/or one or more of networks 240-260, and is registered with an appropriate authority. As further shown in FIG. 5B, when UAV platform 230 determines that UAV 220 is authenticated, UAV platform 230 may retrieve capability information 535 associated with UAV 220 and weighted information 520 from data storage 235 based on request 525 and/or component information of UAV 220 (e.g., provided with request 525). UAV platform 230 may determine suggested component and/or software upgrades 540 for UAV 220 based on weighted information 520 and/or capability information 535. UAV platform 230 may provide suggested component/software upgrades 540 to tablet 210, via a user interface 545 as shown in FIG. 5C, and tablet 210 may display user interface 545 to the employee. In some implementations, UAV platform 230 may provide, to the employee, no access, partial access, or full access, to component/software upgrades 540 and/or user interface 545.

As shown in FIG. 5C, user interface 545 may include information identifying UAV 220 (e.g., a brand, a model number, a serial number, etc. associated with UAV 220). User interface 545 may include a suggested components section that provides information associated with suggested components for UAV 220 (e.g., different cameras and weather sensors that be utilized by UAV 220, pictures of the cameras and weather sensors, rental and/or purchase prices for the cameras and weather sensors, etc.). User interface 545 may also include a section that provides information associated with other components available to UAV 220 (e.g., different batteries, rotors, and IR sensors, pictures of the batteries, rotors, and IR sensors, rental and/or purchase prices for the batteries, rotors, and IR sensors, etc.). User interface 545 may include a suggested software section that provides information associated with suggested software for UAV 220 (e.g., a camera application, an IR application, a weather application, a battery saver application, rental and/or purchase prices for the applications, etc.). User interface 545 may also include a section that provides information associated with other software available to UAV 220 (e.g., a sense and avoid application, a delivery confirmation application, rental and/or purchase prices for the applications, etc.).

Assume that the employee selects the weather application and a particular weather sensor from user interface 545, and instructs tablet 210 to provide the selections to UAV platform 230. Based on the selections, UAV platform 230 may provide the weather application to UAV 220, and UAV 220 may receive and install the weather application. UAV platform 230 may also cause the particular weather sensor to be provided to the employee (e.g., via mail, another UAV 220, etc.) or may provide information indicating a location where UAV 220 may receive the particular weather sensor. For example, UAV platform 230 may identify a base station (e.g., of wireless network 240) where UAV 220 may fly and receive the particular weather sensor (e.g., before delivering the package).

Figure 5D:
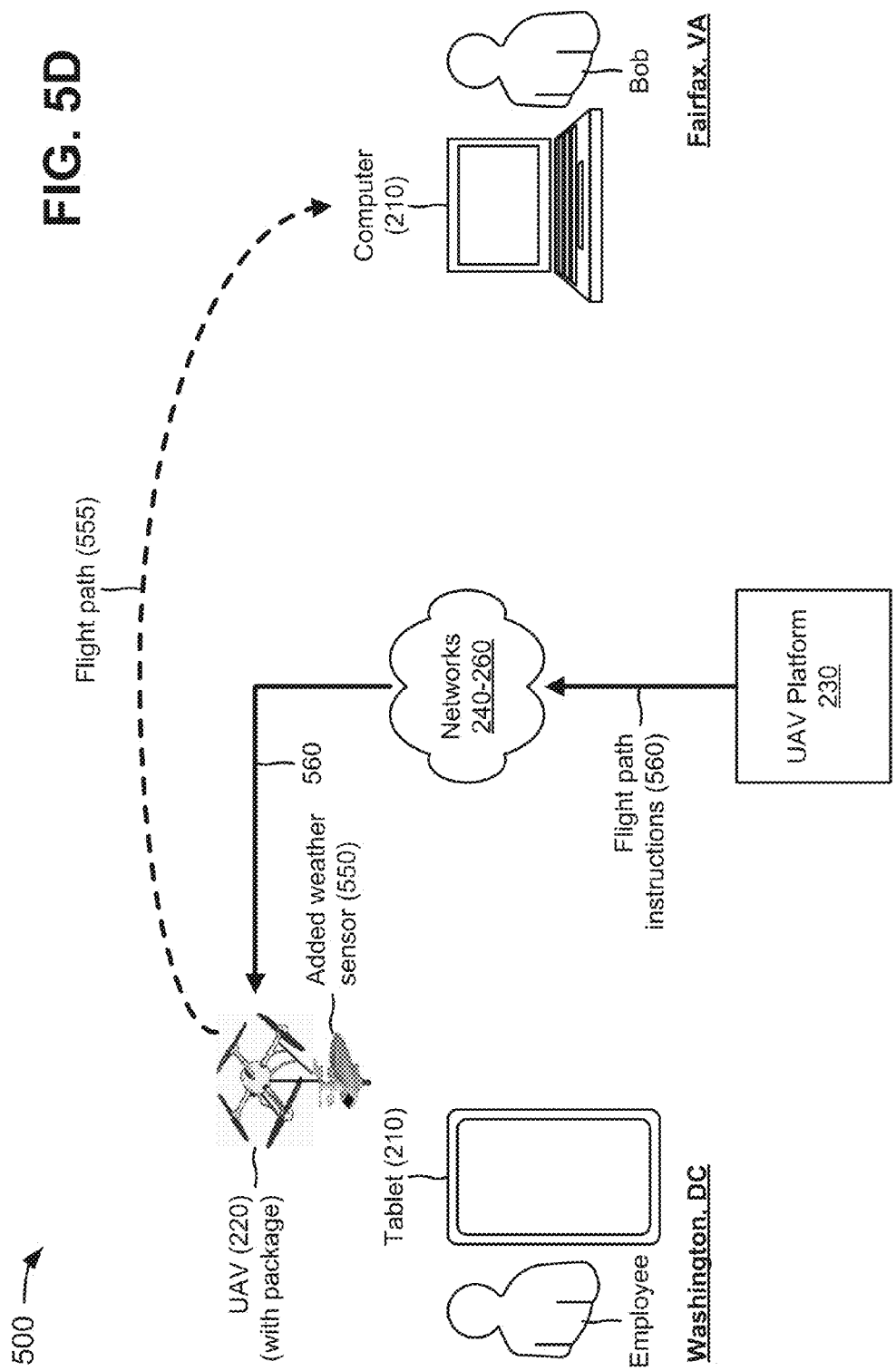

As shown in FIG. 5D, assume that the particular weather sensor is attached to UAV 220, as indicated by reference number 550. UAV platform 230 may calculate a flight path 555 from Washington, D.C. to Fairfax, Va. based on weighted information 520 and/or capability information 535. UAV platform 230 may generate flight path instructions 560 for flight path 555, and may provide flight path instructions 560 to UAV 220 via one or more of networks 240-260. Flight path instructions 560 may include information instructing UAV 220 to fly north at zero degrees for ten kilometers, fly northeast at forty degrees for three kilometers, at an altitude of one-thousand meters, etc. UAV 220 may take off from Washington, D.C., and may travel flight path 555 based on flight path instructions 560.

Figure 5E:
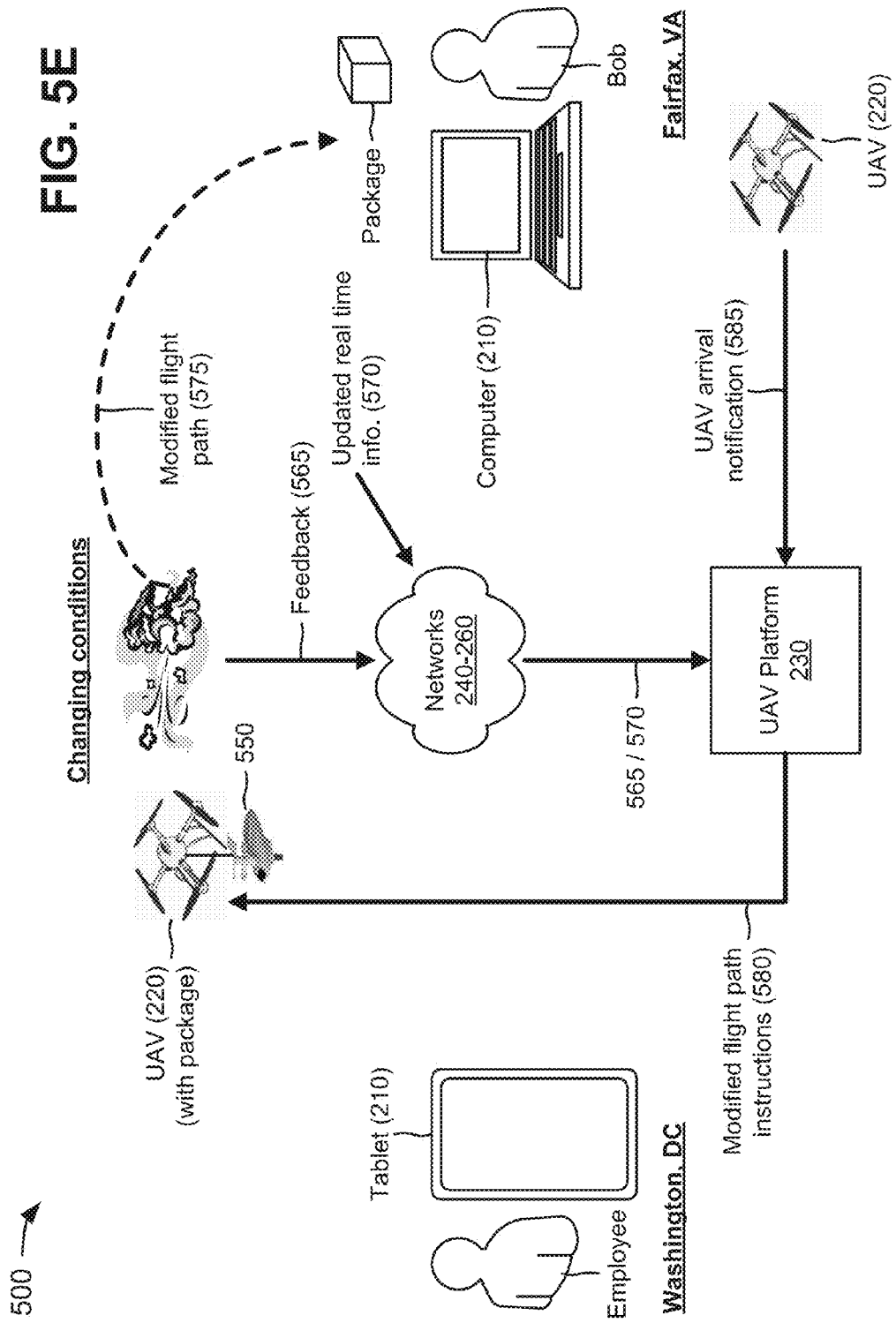

While UAV 220 is traveling along flight path 555, one or more of networks 240-260 may receive feedback 565 from UAV 220 regarding traversal of flight path 555 by UAV 220 (e.g., changing conditions, such as speed, weather conditions, duration, etc.), as shown in FIG. 5E. As further shown in FIG. 5E, one or more of networks 240-260 may also receive updated real time information 570 while UAV 220 is traversing flight path 555. Networks 240-260 may provide feedback 565 and/or updated real time information 570 to UAV platform 230. Assume that feedback 565 and/or updated real time information 570 includes information indicating a weather condition (e.g., a headwind) along flight path 555. UAV platform 230 and/or UAV 220 may calculate a modified flight path 575 that enables UAV 220 to avoid the headwind.

As further shown in FIG. 5E, UAV platform 230 and/or UAV 220 may generate modified flight path instructions 580 for modified flight path 575. UAV platform 230 may provide modified flight path instructions 580 to UAV 220 (e.g., via one or more of networks 240-260). UAV 220 may travel modified flight path 575, based on modified flight path instructions 580, until UAV 220 arrives at Fairfax, Va. As further shown in FIG. 5E, when UAV 220 arrives at Fairfax, Va., UAV 220 may leave the package at a location where Bob may retrieve the package. UAV 220 and/or computer 210 (e.g., via Bob's input or detection of the presence of UAV 220) may generate a notification 585 indicating that UAV 220 and the package arrived safely at a particular location in Fairfax, Va., and may provide notification 585 to UAV platform 230.

As indicated above, FIGS. 5A-5E are provided merely as an example. Other examples are possible and may differ from what was described with regard to FIGS. 5A-5E.

Systems and/or methods described herein may provide a platform that enables UAVs to safely traverse flight paths from origination locations to destination locations. The systems and/or methods may enable the platform to utilize real time information, instead of or in addition to non-real time information, which may improve calculations of flight paths. The systems and/or methods may enable UAVs to upgrade components and/or software so that the UAVs may utilize resources more efficiently and/or traverse flight paths more efficiently.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  receiving, by a first device, real time information associated with aviation in a geographical region and non-real time information associated with aviation in the geographical region,
    at least one of the real time information or the non-real time information including regulatory information,
      the regulatory information including information regarding at least one of:
        no fly zones,
        restricted airspace,
        prohibited airspace, or
        controlled airspace;
  assigning, by the first device, a first weight to the real time information to create first weighted information;
  assigning, by the first device, a second weight to the non-real time information to create second weighted information;
  receiving, by the first device and from a second device, a request for a flight path for an unmanned aerial vehicle to travel from a first geographical location to a second geographical location in the geographical region;
  determining, by the first device, a suggested software upgrade for the unmanned aerial vehicle based on capability information associated with the unmanned aerial vehicle and receiving the request for the flight path;
  calculating, by the first device, the flight path from the first geographical location to the second geographical location based on the first weighted information, the second weighted information, and the capability information,
    at least one of the first weighted information or the second weighted information including the regulatory information;
  generating, by the first device, flight path instructions for the flight path;
  providing, by the first device, the flight path instructions and information identifying the suggested software upgrade to the unmanned aerial vehicle for use by the unmanned aerial vehicle to travel from the first geographical location to the second geographical location via the flight path;
  receiving, by the first device and based on providing the flight path instructions and the information identifying or the suggested software upgrade, feedback from the unmanned aerial vehicle; and
  generating, by the first device and based on the feedback, modified flight path instructions.

2. The method of claim 1, further comprising:
  determining a plurality of possible flight paths from the first geographical location to the second geographical location based on the first weighted information, the second weighted information, and the capability information;
  calculating scores for the plurality of possible flight paths based on the first weight assigned to the real time information and the second weight assigned to the non-real time information; and
  selecting the flight path, from plurality of possible flight paths, based on the calculated scores.

3. The method of claim 2, further comprising:
  ranking the plurality of possible flight paths based on the calculated scores; and
  where selecting the flight path from the plurality of possible flight paths comprises:
    selecting the flight path, from the plurality of possible flight paths, based on the ranking of the plurality of possible flight paths.

4. The method of claim 1, where determining the suggested software upgrade comprises:
  determining a plurality of possible software for the unmanned aerial vehicle based on the capability information;
  calculating scores for the plurality of possible software based on the first weight assigned to the real time information and the second weight assigned to the non-real time information; and
  selecting the suggested software upgrade based on the calculated scores.

5. The method of claim 4, further comprising:
  ranking the plurality of possible software based on the calculated scores; and
  where selecting the suggested software upgrade comprises:
    selecting the suggested software upgrade based on the ranking of the plurality of possible software.

6. The method of claim 1, where the information associated with the suggested software upgrade is provided, for presentation, via a user interface from which the suggested software upgrade may be selected.

7. The method of claim 1, where the real time information and the non-real time information include one or more of:
  weather information associated with the geographical region,
  air traffic information associated with the geographical region, or
  obstacle information associated with the geographical region.

8. A device, comprising:
  one or more processors to:
    receive real time information associated with aviation in a geographical region and non-real time information associated with aviation in the geographical region,
      at least one of the real time information or the non-real time information including regulatory information,
        the regulatory information including information regarding at least one of:
          no fly zones,
          restricted airspace, prohibited airspace, or
controlled airspace;
assign a first weight to the real time information to create first weighted information;
assign a second weight to the non-real time information to create second weighted information;
receive, from a user device, a request for a flight path for an unmanned aerial vehicle to travel from a first geographical location to a second geographical location in the geographical region;
determine a suggested software upgrade for the unmanned aerial vehicle based on capability information associated with the unmanned aerial vehicle and receiving the request for the flight path;
calculate the flight path from the first geographical location to the second geographical location based on the first weighted information, the capability information, and the second weighted information, at least one of the first weighted information or the second weighted information including the regulatory information;
generate flight path instructions for the flight path;
provide the flight path instructions and information identifying the suggested software upgrade to the unmanned aerial vehicle for use by the unmanned aerial vehicle to travel from the first geographical location to the second geographical location via the flight path;
receive, based on providing the flight path instructions and the information identifying the suggested software upgrade, feedback from the unmanned aerial vehicle; and
generate, based on the feedback, modified flight path instructions.

9. The device of claim 8,
where the one or more processors are further to:
assign a third weight to the capability information associated with the unmanned aerial vehicle;
determine a plurality of possible software for the unmanned aerial vehicle based on the capability information and based on the real time information or the non-real time information;
calculate scores for the plurality of possible software based on the third weight assigned to the capability information; and
select the suggested software upgrade based on the calculated scores.

10. The device of claim 9, where the one or more processors are further to:
rank the plurality of possible software based on the calculated scores; and
where, when selecting the suggested software upgrade, the one or more processors are to:
select the suggested software upgrade based on ranking the plurality of possible software.

11. The device of claim 8, where the one or more processors are further to:
determine a plurality of possible software for the unmanned aerial vehicle based on the capability information and based on the real time information or the non-real time information;
generate a user interface that includes information associated with the plurality of possible software; and
present, for display, the user interface to the user device.

12. The device of claim 11, where the one or more processors are further to:

receive, from the user device and via the user interface, a selection of software, from the plurality of possible software; and
cause the selected software to be provided to the unmanned aerial vehicle or to a user associated with the unmanned aerial vehicle.

13. The device of claim 11, where the information associated with the plurality of possible software includes purchase or rental prices associated with the plurality of possible software.

14. The device of claim 8, where the one or more processors are further to:
determine a plurality of possible flight paths from the first geographical location to the second geographical location;
calculate scores for the plurality of possible flight paths based on the first weight assigned to the real time information and the second weight assigned to the non-real time information; and
select the flight path, from plurality of possible flight paths, based on the calculated scores.

15. A computer-readable medium for storing instructions, the instructions comprising:
one or more instructions that, when executed by one or more processors of a device, cause the one or more processors to:
receive real time information associated with aviation in a geographical region and non-real time information associated with aviation in the geographical region,
at least one of the real time information or the non-real time information including regulatory information,
the regulatory information including information regarding at least one of:
no fly zones,
restricted airspace,
prohibited airspace, or
controlled airspace;
assign a first weight to the real time information to create first weighted information;
assign a second weight to the non-real time information to create second weighted information;
receive, from another device, a request for a flight path for an unmanned aerial vehicle to travel from a first geographical location to a second geographical location in the geographical region;
determine a suggested software upgrade for the unmanned aerial vehicle based on capability information associated with the unmanned aerial vehicle and receiving the request for the flight path;
calculate the flight path from the first geographical location to the second geographical location based on the first weighted information, the second weighted information, and the capability information,
at least one of the first weighted information or the second weighted information including the regulatory information;
generate flight path instructions for the flight path;
provide the flight path instructions and information identifying the suggested software upgrade to the unmanned aerial vehicle for use by the unmanned aerial vehicle to travel from the first geographical location to the second geographical location via the flight path;

receive, based on providing the flight path instructions and the information identifying the suggested software upgrade, feedback from the unmanned aerial vehicle; and generate, based on the feedback, modified flight path instructions.

16. The computer-readable medium of claim 15, where the one or more instructions, when executed by the one or more processors, further cause the one or more processors to:

determine a plurality of possible flight paths from the first geographical location to the second geographical location based on the first weighted information, the second weighted information, and the capability information;

calculate scores for the plurality of possible flight paths based on the first weight assigned to the real time information and the second weight assigned to the non-real time information; and select the flight path, from the plurality of possible flight paths, based on the calculated scores.

17. The computer-readable medium of claim 16, where the one or more instructions, when executed by the one or more processors, further cause the one or more processors to:

rank the plurality of possible flight paths based on the calculated scores; and where the one or more instructions, that cause the one or more processors to select the flight path from the plurality of possible flight paths, cause the one or more processors to:

select the flight path, from the plurality of possible flight paths, based on ranking the plurality of possible flight paths.

18. The computer-readable medium of claim 15, where the one or more instructions, that cause the one or more processors to determine the suggested software upgrade, cause the one or more processors to:

determine a plurality of possible software for the unmanned aerial vehicle based on the capability information; and where the one or more instructions that, when executed by the one or more processors, further cause the one or more processors to:

calculate scores for the plurality of possible software based on the first weight assigned to the real time information and the second weight assigned to the non-real time information; and select the suggested software upgrade based on the calculated scores.

19. The computer-readable medium of claim 18, where the one or more instructions, when executed by the one or more processors, further cause the one or more processors to:

rank the plurality of possible software based on the calculated scores; and where the one or more instructions, that cause the one or more processors to select the suggested software upgrade, cause the one or more processors to:

select the suggested software upgrade based on ranking the plurality of possible software.

20. The computer-readable medium of claim 15, where the one or more instructions, when executed by the one or more processors, further cause the one or more processors to:

determine a plurality of possible software for the unmanned aerial vehicle based on the capability information;

generate a user interface that includes information associated with the plurality of possible software; and present, for display, the user interface to the other device.

* * * * *